(12) United States Patent
Kagami

(10) Patent No.: US 12,057,591 B2
(45) Date of Patent: Aug. 6, 2024

(54) SEALED BATTERY

(71) Applicant: TOYOTA JIDOSHA KABUSHIKI KAISHA, Toyota (JP)

(72) Inventor: Ryo Kagami, Ichinomiya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/339,014

(22) Filed: Jun. 4, 2021

(65) Prior Publication Data

US 2021/0399374 A1    Dec. 23, 2021

(30) Foreign Application Priority Data

Jun. 22, 2020  (JP) ................. 2020-106749

(51) Int. Cl.
*H01M 50/197*  (2021.01)
*H01M 10/04*   (2006.01)
(Continued)

(52) U.S. Cl.
CPC ..... *H01M 50/197* (2021.01); *H01M 10/0413* (2013.01); *H01M 10/0436* (2013.01);
(Continued)

(58) Field of Classification Search
CPC ....... H01M 50/10–197; H01M 50/124; H01M 50/50–553; H01M 10/0413; H01M 10/0436; H01M 10/0585
See application file for complete search history.

(56) References Cited

U.S. PATENT DOCUMENTS

| | | | |
|---|---|---|---|
| 10,388,918 B2 * | 8/2019 | Kim ................... | H01M 50/129 |
| 2005/0122664 A1 * | 6/2005 | Takahashi ......... | H01M 10/0525 |
| | | | 361/530 |

(Continued)

FOREIGN PATENT DOCUMENTS

| | | |
|---|---|---|
| CN | 1619729 A | 5/2005 |
| JP | 2005285506 A | 10/2005 |

(Continued)

OTHER PUBLICATIONS

Google English Translation of WO 2013046549, originally published to Fukuda Shinsuke on Apr. 4, 2013 (Year: 2013).*

*Primary Examiner* — Cynthia H Kelly
*Assistant Examiner* — Niara Trant
(74) *Attorney, Agent, or Firm* — Dickinson Wright, PLLC

(57) ABSTRACT

Provided is a technique capable of suppressing movement of an electrode body inside an exterior body. According to the technique disclosed herein, a sealed battery is provided, which includes an electrode body having a wide face having a rectangular shape, an exterior body made of a laminated film, and positive electrode and negative electrode current collector terminals. The exterior body includes a housing part housing the electrode body, and a sealed part formed around the housing part to isolate the inside and the outside of the exterior body from each other. The housing part has a flat face facing the wide face of the electrode body and four side walls corresponding to four sides of the wide face respectively, the four side walls being formed so as to rise from the sealed part toward the flat face. A pair of the side walls corresponding to long sides of the wide face curves toward the electrode body and inward of the exterior body so as to closely approach the electrode body.

2 Claims, 8 Drawing Sheets

(51) Int. Cl.
*H01M 10/0585* (2010.01)
*H01M 50/124* (2021.01)
*H01M 50/553* (2021.01)

(52) U.S. Cl.
CPC ..... *H01M 10/0585* (2013.01); *H01M 50/124* (2021.01); *H01M 50/553* (2021.01)

(56) References Cited

U.S. PATENT DOCUMENTS

| | | | |
|---|---|---|---|
| 2010/0047685 A1* | 2/2010 | Lee | H01M 50/566 429/176 |
| 2015/0340733 A1* | 11/2015 | Kwon | H01M 10/0583 429/94 |
| 2017/0117572 A1 | 4/2017 | Ichikawa | |
| 2021/0384593 A1 | 12/2021 | Kim | |

FOREIGN PATENT DOCUMENTS

| | | |
|---|---|---|
| JP | 2005285526 A | 10/2005 |
| JP | 2007123003 A | 5/2007 |
| JP | 2014238912 A | 12/2014 |
| KR | 10-2018-0127767 A | 11/2018 |
| WO | 2013046549 A1 | 4/2013 |
| WO | 2015151580 A1 | 10/2015 |

\* cited by examiner

SEALED BATTERY

CROSS REFERENCE TO RELATED APPLICATIONS

This application claims priority to Japanese Patent Application No. 2020-106749, filed Jun. 22, 2020, the entire contents of which are incorporated herein by reference.

BACKGROUND

The present invention relates to a sealed battery including an exterior body made of a laminated film, and more particularly to a structure of an electrode body housing part which is formed in the exterior body.

Research and development on various types of batteries have been energetically carried out in recent years. Among these, secondary batteries, e.g., a lithium ion secondary battery, have become more important as on-board power supplies for vehicles, or power supplies for personal computers, mobile terminals, etc. Particularly, a lithium ion secondary battery, which is a lightweight battery offering high energy density, is used preferably as an on-board high power supply for vehicles.

Such secondary battery can typically be a sealed battery having a configuration in which an electrode body, a power generation element, including a positive electrode and a negative electrode is housed inside an exterior body and then sealed therein.

There has been a growing demand for downsized batteries in recent years, and a sealed battery including an exterior body made of a laminated film has been energetically developed. In the sealed battery including an exterior body made of a laminated film, typically, an electrode body is held between a laminated film and another laminated film, and is housed inside an exterior body by sealing the laminated films together along a peripheral portion of the electrode body.

Concerning arrangement of an electrode body inside an exterior body, Japanese Patent Application Publication No. 2005-285506 and WO 2015/151580 disclose that a laminated film is embossed in advance, and an electrode body is arranged in a space inside the embossed portion. In this way, a housing part that houses an electrode body is disposed on a laminated film, whereby it possible to arrange an electrode body at a suitable position inside an exterior body.

When a sealed battery is a so-called all-solid-state battery including a solid electrolyte as an electrolyte, generally, an electrode body is held between a laminated film and another laminated film, and thereafter sealing is implemented in a state where the pressure inside the exterior body is reduced. This results in the electrode body being held inside the exterior body.

SUMMARY

When an electrode body is arranged inside a housing part that is formed on a laminated film in advance, the electrode body may move inside the housing part if the laminated film, i.e., the housing part, and the electrode body are away from each other. The movement of the electrode body inside the housing part may cause deformation of and damage to edge portions of the electrode body, which leads to a short circuit and thus is not preferable.

The present invention has been made with such a point in view. A major object of the present invention is to provide a technique capable of suppressing movement of an electrode body inside an exterior body in a sealed battery including the exterior body having a housing part as described above.

The inventor of the present invention focused on a structure of a housing part of a laminate exterior body. The inventor then found that when part of such a housing part is curved toward an electrode body, it possible to suppress movement of the electrode body inside the housing part, and thus, completed the present invention.

According to the technique disclosed herein, a sealed battery is provided, which includes: an electrode body including a positive electrode and a negative electrode, the electrode body having a wide face in a rectangular shape; an exterior body housing the electrode body, the exterior body being made of a laminated film; and a positive electrode current collector terminal and a negative electrode current collector terminal for external connection, wherein the positive electrode and negative electrode current collector terminals is included in the positive electrode and the negative electrode respectively, and at least respective parts of the positive electrode and negative electrode current collector terminals is arranged outside the exterior body.

The exterior body includes a housing part housing the electrode body, and a sealed part formed around the housing part, wherein the sealed part isolates an inside and an outside of the exterior body from each other.

The housing part has a flat face facing the wide face of the electrode body, and four side walls corresponding to four sides of the wide face respectively. The four side walls rise from the sealed part toward the flat face.

A pair of the side walls corresponding to long sides of the wide face, among the four side walls, curves inward of the exterior body and toward the electrode body so as to closely approach the electrode body.

According to such a structure, the side walls of the housing part curve and closely approach the electrode body, and this suppresses movement of the electrode body inside the exterior body. Therefore, deformation of and damage to the electrode body accompanying the movement of the electrode body can be prevented.

Preferably, a periphery of the exterior body has two long side parts corresponding to long sides of the wide face and two short side parts corresponding to short sides of the wide face in a state where the electrode body is housed in the exterior body. Here, a ratio of a length of the respective long side parts to a length of the respective short side parts is 2 or more.

Such a structure can realize the effect of preventing the terminal structure from deforming, in addition to the foregoing effect of suppressing the movement of the electrode body.

In one aspect of the sealed battery disclosed herein, a ratio of the length of the respective long side parts to a width of the sealed part in the long side parts is 15 or more.

The technique disclosed herein can also preferably give a sealed battery including an exterior body having such a ratio of measurements the effect of preventing wrinkles and warps, in addition to the foregoing effect of suppressing the movement of the electrode body.

In another aspect, the positive electrode current collector terminal and the negative electrode current collector terminal are both arranged on a short side of the wide face, which has a rectangular shape, of the electrode body.

Such a structure can more preferably realize the effect of preventing the terminal structure from deforming, in addition to the foregoing effect of suppressing the movement of the electrode body.

In another embodiment, the laminated film has a metal layer and a resin layer, the metal layer having a thickness of 100 μm or less.

The technique disclosed herein can also preferably give a sealed battery including an exterior body made of such a laminated film the effect of preventing wrinkles and warps and the effect of preventing the terminal structure from deforming, in addition to the foregoing effect of suppressing the movement of the electrode body.

In the two long sides and two short sides of the flat face of the housing part, a ratio of a distance between a curve apex in one of the two long sides and a curve apex in the other of the two long sides, to a length of the respective short sides is 0.9 or more and 0.99 or less.

In a sealed battery having such a structure, a space inside a housing part is provided suitably compared with the size of an electrode body housed in the housing part, and this makes it possible to realize the effect of preventing the terminal structure from deforming and the effect of preventing wrinkles and warps together with the effect of preventing the electrode body from moving at a high level when the foregoing ratio is within the range from 0.9 to 0.99.

DETAILED DESCRIPTION

Figure 1:
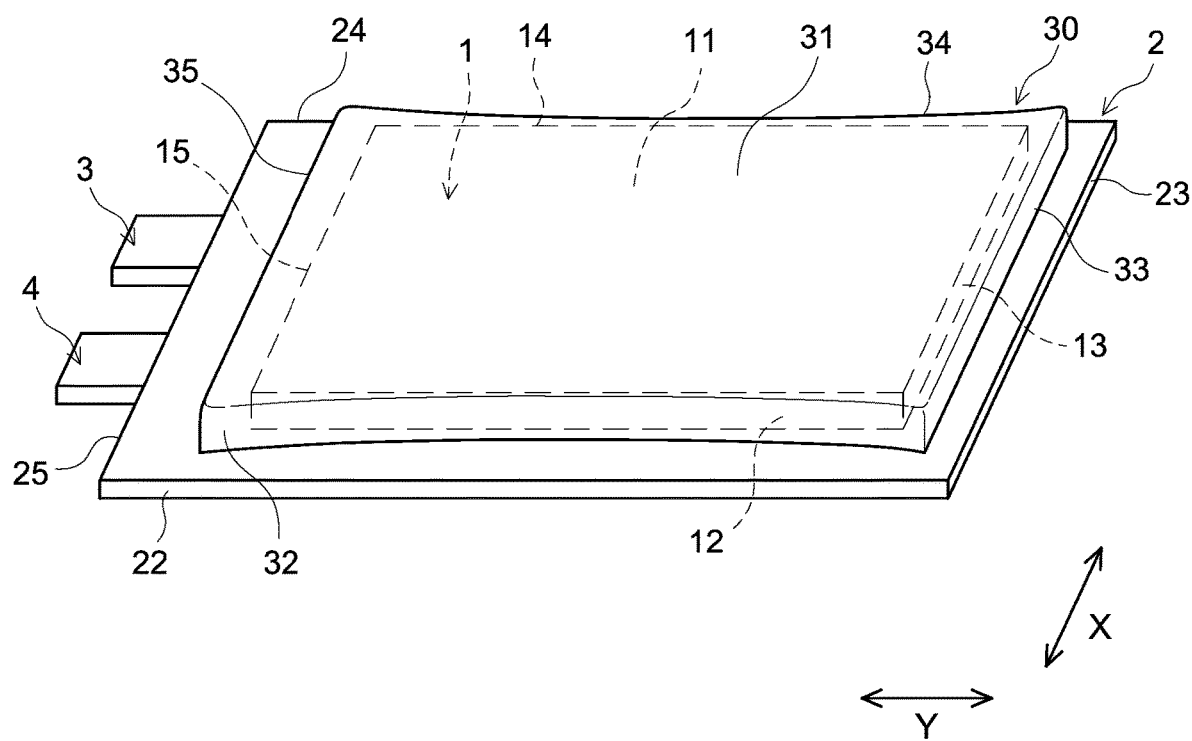
FIG. 1 is a perspective view schematically showing the structure of a sealed battery according to one embodiment.

Hereinafter one embodiment of the present invention will be described. In the drawings, members and parts which lead to the same operation are illustrated as given the same reference signs. The relationship between measurements including length, width, thickness, etc. in each figure does not reflect the actual relationship. Matters not particularly mentioned in the present description but necessary for carrying out the present invention such as the structure and material of an electrode body in detail may be grasped as design matters by the person skilled in the art based on conventional arts in the relevant field. In the present description, expression "A to B" showing a numeral range means A or more and B or less, which encompass any numbers more than A and less than B.

In the present description, "secondary battery" means a common repeatedly rechargeable and dischargeable electricity storage device, and encompasses so-called storage batteries, that is, chemical batteries including a lithium ion secondary battery, a nickel-hydrogen battery and a nickel-cadmium battery, and capacitors, that is, physical batteries including an electric double layer capacitor.

Hereinafter a sealed battery to which the technique disclosed herein is applied will be described in detail as an all-solid-state lithium ion secondary battery including a laminated electrode body is given as an example.

Figure 2:
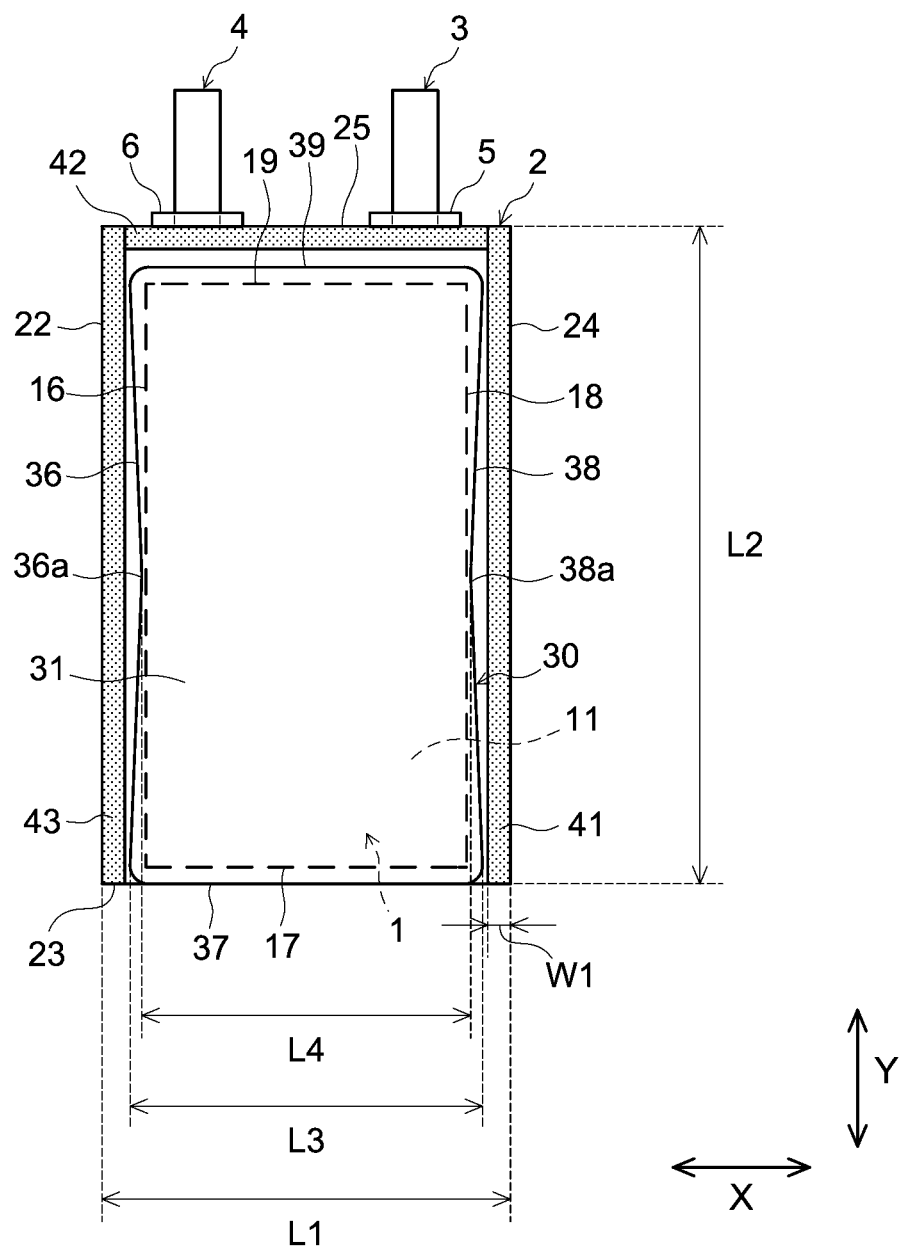
FIG. 2 is a plan view schematically showing the structure of the sealed battery according to the one embodiment.

As shown in FIGS. 1 and 2, a sealed battery 100 roughly includes an electrode body 1, an exterior body 2, a positive electrode current collector terminal 3 and a negative electrode current collector terminal 4. The electrode body 1 is housed inside the exterior body 2 that is in a thermal-welded or heat-sealed state along a peripheral portion. Respective parts of the positive electrode current collector terminal 3 and the negative electrode current collector terminal 4 are arranged outside the exterior body 2.

The electrode body 1 has two rectangular flat wide faces, and is in the form of a rectangular parallelepiped having such two wide faces as bottom faces, and four side faces.

The electrode body 1 includes a positive electrode, a negative electrode and a solid electrolyte layer, detailed illustrations of which are omitted.

The electrode body 1 in the present embodiment is a laminated electrode body, and includes, as the positive electrode, a positive electrode sheet having a rectangular sheet-shaped positive electrode current collector and a positive electrode mixture layer coated over the surface, that is, one or both face(s) of the positive electrode current collector. The electrode body 1 includes, as the negative electrode, a negative electrode sheet having a rectangular sheet-shaped negative electrode current collector and a negative electrode mixture layer coated over the surface, that is, one or both face(s) of the negative electrode current collector. The positive electrode sheet and the negative electrode sheet each have current collector exposure portions where no mixture layer is formed, at respective one end portions in the direction of the long sides of the sheets, (that is, in the direction Y of the long sides of the wide faces of the electrode body 1 in FIGS. 1 and 2). Such current collector exposure portions are formed like a tab, and stick out of the short sides of the sheets toward the outside. The positive electrode sheet and the negative electrode sheet are alternately laminated as the solid electrolyte layer is interposed therebetween to form the electrode body 1. An area including the center of the electrode body 1 is a core portion where the electrode mixture layers are laminated. The current collector exposure portions, that is, the current collectors are laminated at the respective one end portions in the direction of the long sides of the sheets. The current collector exposure portions are collected in the direction of laminating the sheets to form current collector terminal joint portions for external connection.

The positive electrode current collector terminal 3 is joined to a positive electrode current collector terminal joint portion, and the negative electrode current collector terminal 4 is joined to a negative electrode current collector terminal joint portion. As shown in the figures, the positive electrode current collector terminal 3 and the negative electrode current collector terminal 4 are both arranged on the side of a short side 19 of the wide face 11 of the electrode body 1, and drawn from the inside of the exterior body 2 to the outside. The positive electrode current collector terminal 3 and the negative electrode current collector terminal 4 are covered with thermal-welded films 5 and 6 respectively. The thermal-welded films 5 and 6 are held between the current collector terminals and the exterior body 2.

The structure of the electrode body 1 is not particularly limited in detail as long as the current collector terminal joint portions are formed as described above and the positive electrode and negative electrode current collector terminals are joined to the positive electrode and negative electrode current collector terminal joint portions respectively. Any members and materials typically used for the lithium ion secondary battery of this type may be used for the members and materials constituting the electrode body 1 such as current collector foil, the mixture layers, and the solid electrolyte layer without particular limitations. Since such members and materials do not characterize the present invention, detailed description thereof is omitted.

The positive electrode current collector terminal 3 and the negative electrode current collector terminal 4 are conductive members electrically connecting the electrode body 1 and external devices. Such current collector terminals are not particularly limited, but for example, are made of a conductive material such as aluminum, copper and nickel.

The thermal-welded films 5 and 6 are members for preferably welding the current collector terminals and the exterior body 2. The material of the thermal-welded films 5 and 6 may be any resin material that is melted at a temperature approximately the same as the melting temperature of the exterior body 2, specifically a first resin layer described later, and that shows preferred weldability to both resin and metallic materials. The thermal-welded films 5 and 6 are not particularly limited, but for example, may be films of a multilayer structure including a modified polypropylene and a polyolefin layer.

The exterior body 2 is a battery case made of a laminated film. As shown in the figures, the exterior body 2 is formed by folding one laminated film and welding halves of the laminated film to each other along the peripheral. The exterior body 2 houses the electrode body 1 thereinside.

As shown in the figures, the exterior body 2 has a rectangular shape which is shown as a rectangle in the figures. The exterior body 2 has two long side parts 22 and 24, and two short side parts 23 and 25. The two long side parts 22 and 24 correspond to long sides 16 and 18 of the electrode body 1. The two short side parts 23 and 25 correspond to short sides 17 and 19 of the electrode body 1.

A housing part 30 for housing the electrode body 1, and sealed parts 41, 42 and 43 around the housing part 30 are formed on the exterior body 2. Such sealed parts isolate the inside and the outside of the exterior body 2 from each other.

The housing part 30 has a flat face 31 and four side walls 32, 33, 34 and 35. The flat face 31 faces the wide face 11 of the electrode body 1. The side walls 32, 33, 34 and 35 are formed to rise from the sealed parts toward the flat face 31 so as to surround the circumference of the electrode body 1.

As shown in FIG. 1, the side wall 33 and the side wall 35 face each other. In a state where the electrode body 1 is housed inside, the side wall 33 and the side wall 35 face each other, and a side face 13 and a side face 15 that are on the respective sides of the short sides of the wide face 11 of the electrode body 1 face each other.

The side wall 32 and the side wall 34 face each other. In a state where the electrode body 1 is housed inside, the side wall 32 and the side wall 34 face each other, and a side face 12 and a side face 14 that are on the respective sides of the long sides of the wide face 11 of the electrode body 1 face each other. The side wall 32 and the side wall 34 curve toward the electrode body 1 in the direction of the inside of the exterior body 2, and are in close vicinity to the side face 12 and the side face 14. The side wall 32 and the side wall 34 may be in contact with the electrode body 1, that is, the side face 12 and the side face 14, and is preferably in contact with the electrode body 1 in view of suppression of movement of the electrode body 1.

High flexibility of an exterior body made of a laminated film may cause some problem in the steps when batteries are produced. For example, when an all-solid-state battery is produced, stress is generated in a peripheral portion of an exterior body in the step of reducing the pressure inside the exterior body, so that the peripheral portion may curve. It is not preferable for a peripheral portion of an exterior body to curve because this leads to wrinkles and warps in welding, which cause defects in welding to lower sealability of a sealed battery, or cause foldability of sealed parts to lower. It is not preferable either for a portion where current collector terminals are arranged to curve to deform the terminal structure because this may cause the electrode body to be damaged or short circuits.

In view of prevention of the terminal structure from deforming, the ratio $L2/L1$ of the length $L2$ of the respective long side parts 22 and 24 to the length $L1$ of the respective short side parts 23 and 25 of the exterior body 2 is more than 1, more preferably 1.5 or more, and further preferably 2 or more. The ratio $L2/L1$ may be typically 10 or less, for example, 5 or less or 3 or less.

In FIG. 2, $L1$ indicates a length of a side of the exterior body 2 where the current collector terminals are arranged, and $L2$ indicates a length of a side of the exterior body 2 where the current collector terminals are not arranged. That is, the ratio $L2/L1$ can be described as the ratio of the length $L1$ of the side where the current collector terminals are arranged, and the length $L2$ of the side where the current collector terminals are not arranged.

As described in the following test example 1, the ratio $L2/L1$ within the foregoing range makes stress that may be generated at a peripheral portion where the current collector terminals are arranged in the exterior body 2, that is, the short side part 25 of the exterior body 2 in FIG. 2 in a pressure reduction step described later lighter, which makes it possible to suppress deformation of the terminal structure.

As described in the following test example 2, the longer the length $L2$ of the respective long side parts 22 and 24 of the exterior body 2 is compared to the width $W1$ of the respective sealed parts 41 and 43 in the long side parts 22 and 24, that is, the length of the exterior body 2 in the direction X of the short sides, the easier stress is generated at such long side parts to lead to wrinkles, warp, etc. in the pressure reduction step described later. Since being a low rigid material, a laminated film easily deforms. Deformation of the housing part in the following pressure reduction step may cause the sealed parts to unnaturally deform. In particular, in the sealed battery having the ratio $L2/W1$ of the length $L2$ of the respective long side parts 22 and 24 to the width $W1$ of the respective sealed parts 41 and 43 in the long side parts 22 and 24 being 15 or more, wrinkles, warps, etc. due to the pressure reduction step are easily formed. The technique disclosed herein is preferably applied to such a sealed battery 100.

Concerning the two long sides 36 and 38 and the two short sides 37 and 39 of the flat face 31 of the housing part 30, the ratio $L4/L3$ of the distance $L4$ between a curve apex $36a$ of the long side 36 and a curve apex $38a$ of the long side 38 to the length L3 of the respective short sides is preferably 0.9 to 0.99. The ratio L4/L3 within the foregoing range can preferably suppress movement of the electrode body 1 inside the exterior body 2.

The exterior body 2 typically includes the first resin layer, a metal layer and a second resin layer that are omitted in the figures. Such layers are laminated in the order mentioned from the inside to the outside of the exterior body 2.

The first resin layer is the inmost layer of the exterior body 2, and is a layer closest to the electrode body 1. The first resin layer is a layer for allowing the halves of the laminated film to be welded to each other, and is typically made from a thermoplastic resin. Examples of a thermoplastic resin include crystalline resins such as polyolefins including polyethylene (PE) and polypropylene (PP); and polyesters including polyethylene terephthalate (PET); and amorphous resins such as polystyrene and polyvinyl chloride.

The metal layer is a layer giving the exterior body 2 strength. The metal layer may have a function of blocking movement of air between the inside and the outside of the exterior body 2. Examples of the material constituting the metal layer include aluminum, iron and stainless.

Adjustment of the thickness of the metal layer can adjust the rigidity of the exterior body 2. The thickness of such a metal layer is not particularly limited, but is typically 0.01 μm to 200 μm. The effects of the technique disclosed herein can be preferably realized even when a laminated film having comparatively low rigidity which includes the metal layer having a thickness of 0.01 μm to 100 μm is used.

The second resin layer is located nearer the outer surface than the metal layer, and may be the outermost layer of the exterior body 2. For example, the second resin layer can improve the durability of the exterior body 2. Examples of the material constituting such a second resin layer include polyethylene terephthalate (PET) and polyamide.

The number of the layers constituting the exterior body 2 is not particularly limited, and may be 3 or more, or 4 or more, for example, 4 to 10. An adhesive layer may be disposed between the layers. A print layer etc. may be disposed as the outermost layer.

A method of producing the sealed battery disclosed herein roughly encompasses an electrode body preparation step, a current collector terminals fitting step, an arrangement step, a first heating step, the pressure reduction step, a second heating step and a cutting step (see FIGS. 3 to 6).

First, the electrode body 1 is assembled (electrode body preparation step). The method of assembling the electrode body 1 may be the same as the conventional, and does not characterize the present invention. Thus, detailed description of this step is omitted.

Next, the positive electrode current collector terminal 3 and the negative electrode current collector terminal 4 are fit to the current collector terminal joint portions of the electrode body 1 (terminals fitting step). At this time, the thermal-welded films 5 and 6 are arranged at the positive electrode current collector terminal 3 and the negative electrode current collector terminal 4. Conventionally known joining means such as ultrasonic welding, laser welding and electric resistance welding may be used as means of joining the current collector terminals to the current collector terminal joint portions without any particular limitations.

Figure 3:
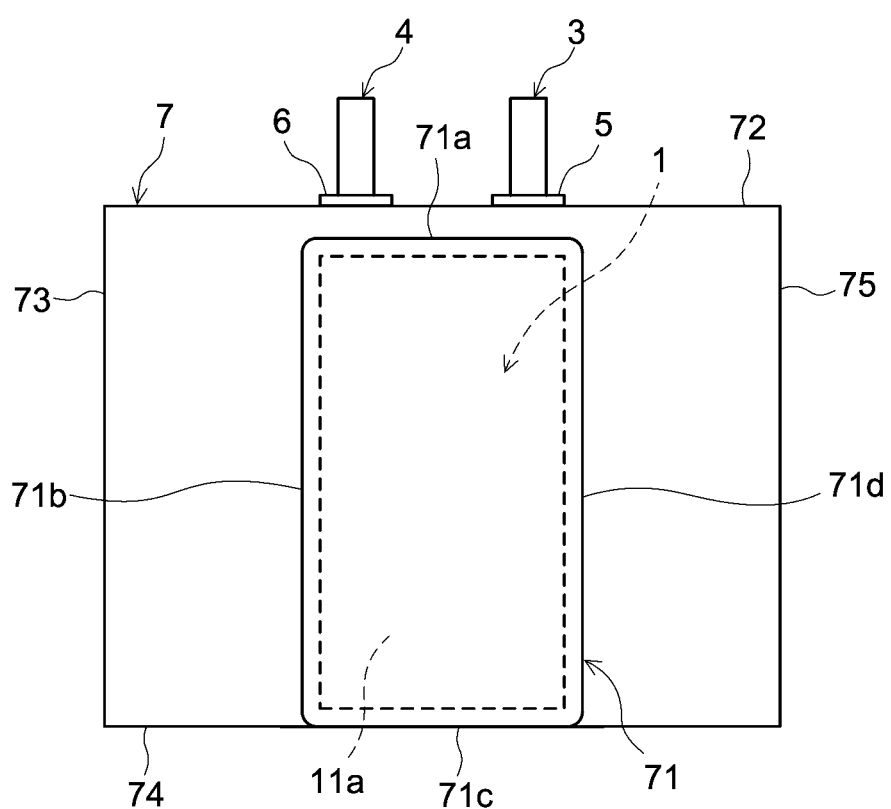
FIG. 3 is a plan view schematically showing one step in a method of producing the sealed battery according to one embodiment.

Next, as shown in FIG. 3, the electrode body 1, to which the current collector terminals are fit, and the laminated film 7 are arranged on predetermined portions (arrangement step). Specifically, first, the laminated film 7, where a housing part 71 is formed in advance by, for example, embossing, is prepared. Next, the electrode body 1 is arranged inside the housing part 71, and the laminated film 7 is folded to wrap the electrode body 1. At this time, the electrode body 1 is arranged so as to be in a state where at least respective parts of the positive electrode current collector terminal 3 and the negative electrode current collector terminal 4 are drawn to the outside of the laminated film. Also, the thermal-welded films 5 and 6 are arranged so as to be in a state where at least respective parts thereof are drawn to the outside of the laminated film.

The housing part 71 may be formed so as to be arranged on the sides of both faces of the electrode body 1 when the laminated film 7 is arranged to wrap the electrode body 1 as described above. Or, the housing part 71 may be formed so as to be arranged only on a side of one face of the electrode body 1, that is, on the side of the wide face 11a in FIG. 3. I.e., in this case, part of the laminated film 7 which is arranged on a side of a wide face different from the side of the wide face 11a is flat, and the housing part is not formed thereon.

Figure 4:
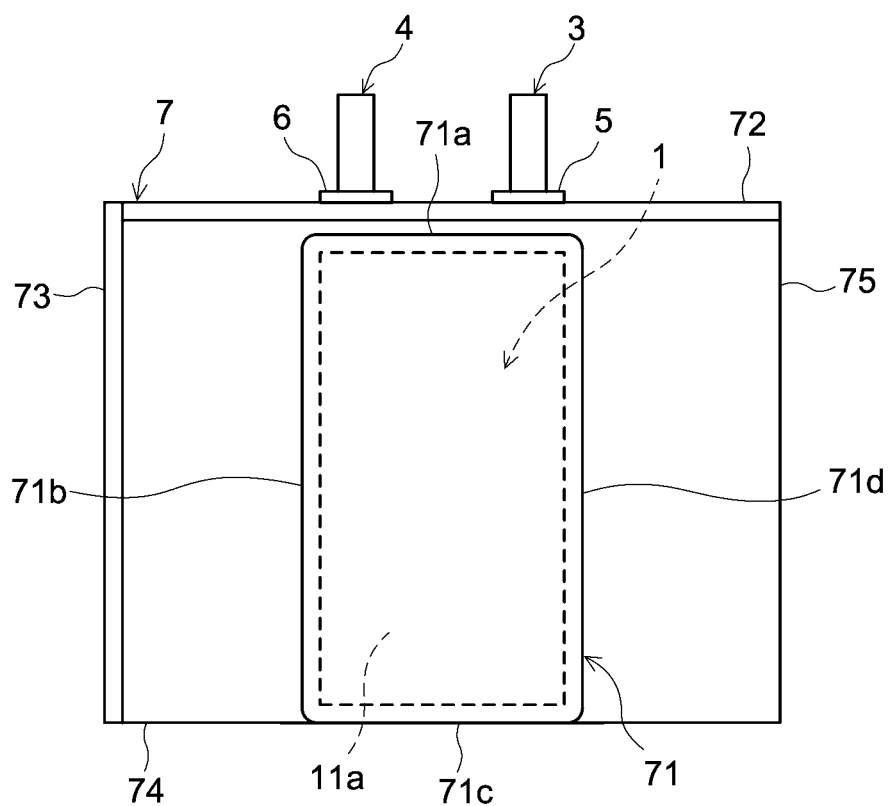
FIG. 4 is a plan view schematically showing one step in the method of producing the sealed battery according to the one embodiment.

Next, as shown in FIG. 4, the laminated halves of the laminated film 7 are thermal-welded to each other along an edge part 73 on the side of a long side of the wide face 11a of the electrode body 1, and an edge part 72 on the side of the short side where the current collector terminals 3 and 4 and the thermal-welded films 5 and 6 are arranged in the laminated film 7 (first heating step). The edge parts 72 and 73 are held between a heating part of a heat sealer on both sides thereof in the direction of holding the electrode body 1. A predetermined amount of heat is applied to the edge parts 72 and 73, to thermal-weld the halves of the laminated film 7 to each other. The thermal welding order of the edge parts 72 and 73 is not particularly limited. In view of fixing the current collector terminals 3 and 4 and the thermal-welded films 5 and 6, first the edge part 72, and then the edge part 73 are preferably thermal-welded.

In this step, the halves of the laminated film 7 are not welded to each other along an edge part 75 on the side of the other long side of the wide face 11a which is different from the edge part 73, and are kept open. An edge part 74 on the side of the other short side of the wide face 11a which is different from the edge part 72 is a folded portion of the laminated film 7, and thus does not need thermal welding thereon.

Figure 5:
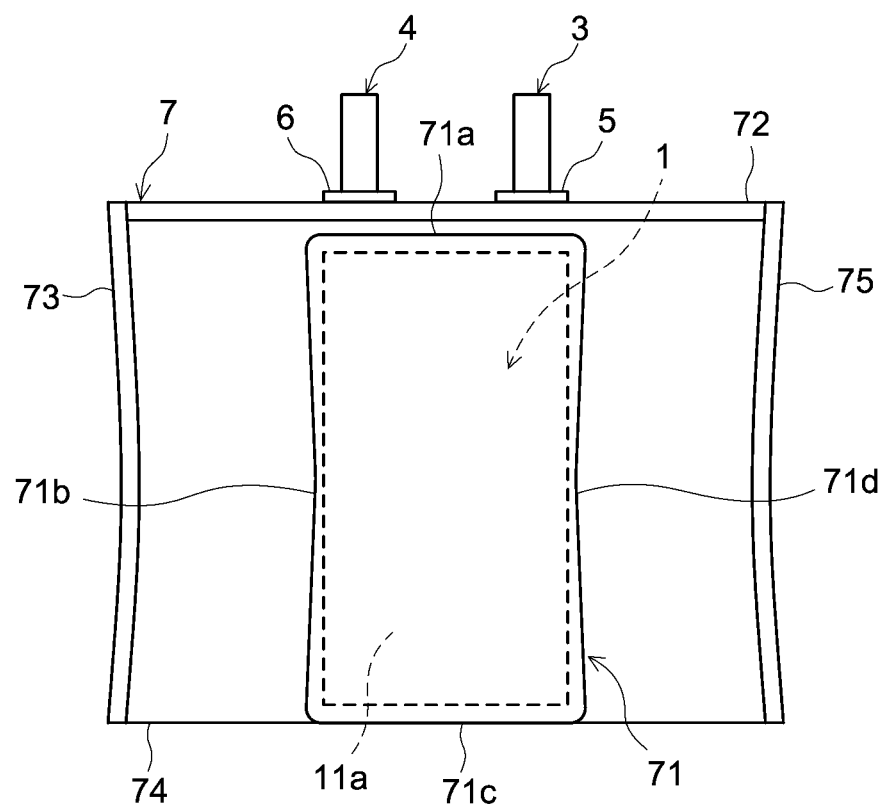
FIG. 5 is a plan view schematically showing one step in the method of producing the sealed battery according to the one embodiment.

Next, the pressure inside the laminated film 7 in the form of a bag because of the foregoing thermal welding is reduced, so that the inside is in a vacuumed state, that is, approximately dozens to 99 kPa (pressure reduction step). As shown in FIG. 5, this allows a side wall 71b and a side wall 71d on the sides of the long sides of the housing part 71, that is, the sides of the long sides of the wide face 11a to curve toward the electrode body 1 so that the side wall 71b and the side wall 71d are in close vicinity to the electrode body 1. The edge part 73 and the edge part 75 on the sides of the long sides of the wide face 11a of the electrode body 1 in the laminated film 7 may curve inwards. In the present embodiment, a sealed part formed along the edge part 72 where the current collector terminals 3 and 4 are arranged corresponds to the sealed part 42 in the short side part 25 in FIG. 2. As described above, it is not preferable to deform the terminal structure. Thus, the pressure-reduced state is adjusted so that a side wall 71a and a side wall 71c on the sides of the short sides of the housing part 71 do not curve. In view of the sealability of the sealed battery and the foldability of the sealed parts, the pressure-reduced state is adjusted so that wrinkles and warps are not formed around the side wall 71*b* and the side wall 71*d* when such side walls curve as described above.

Further, the halves of the laminated film 7 are thermal-welded to each other along the edge part 75, where thermal welding is not performed in the first heating step. As a result of this, there is no opening portion in the laminated film 7, and the laminated film 7 is sealed in a state of housing the electrode body 1 thereinside.

Figure 6:
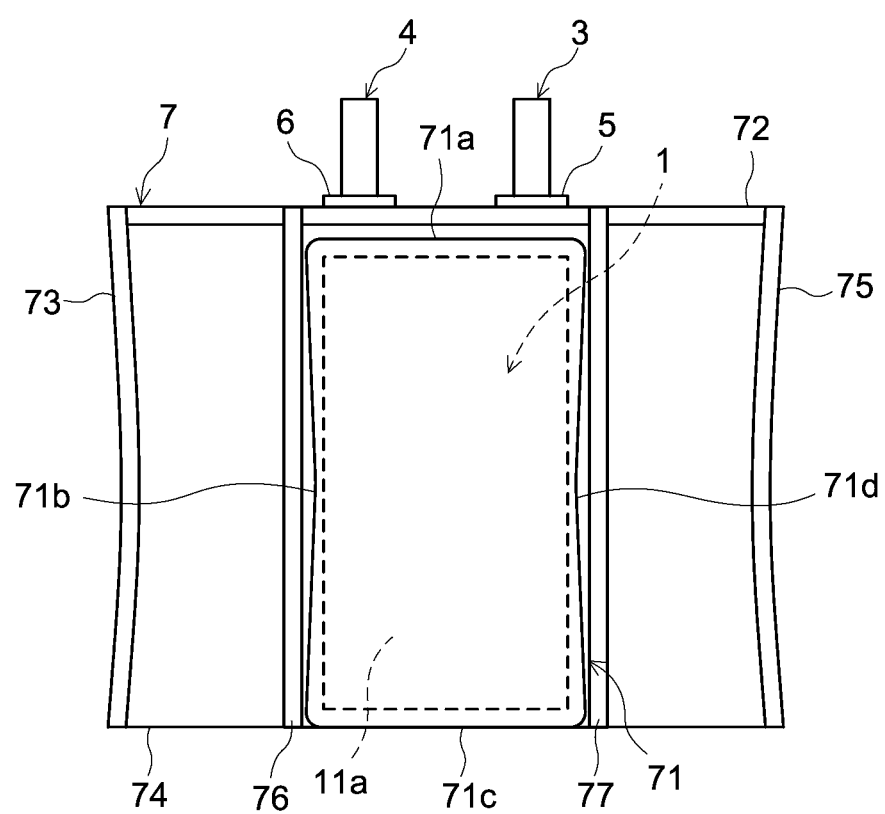
FIG. 6 is a plan view schematically showing one step in the method of producing the sealed battery according to the one embodiment.

Next, as shown in FIG. 6, the laminated halves of the laminated film 7 are thermal-welded to each other around the sides of the long sides of the housing part 71 (second heating step). The halves of the laminated film 7 are held between a heating part of a heat sealer on both sides thereof in the direction of holding the electrode body 1. A predetermined amount of heat is applied to the laminated film 7, to thermal-weld the halves of the laminated film 7 to each other to form a sealed part 76 and a sealed part 77. The sealed part 76 and the sealed part 77 are straight lines as shown in FIG. 6, and do not curve. That is, no wrinkle or warp is formed on the sealed parts 76 and the sealed part 77.

Next, the laminated film 7 is cut along the sealed part 76 and the sealed part 77 (cutting step). As a result of this, the sealed battery is made. The sealed part 76 and the sealed part 77 correspond to the sealed part 43 and the sealed part 41 respectively in the sealed battery 100 in FIG. 2.

The production method disclosed herein is capable of suppressing movement of an electrode body inside an exterior body. This method is capable of realizing the effect of suppressing deformation of a short side part of an exterior body where current collector terminals are arranged and the effect of preventing wrinkles and warps on long side parts of the exterior body in addition to the effect of suppressing the movement of an electrode body. Therefore, the production method disclosed herein is not particularly limited, but can be particularly preferably used in production of a sealed battery including an exterior body having the ratio of measurements as described above. The production method disclosed herein is not particularly limited, but can be particularly preferably used when a laminated film having comparatively low rigidity as described above is used as an exterior body.

Variation 1

In the foregoing production method, the pressure reduction step is carried out, to curve the side wall 32 and the side wall 34 on the sides of the long sides of the housing part 30 (see FIG. 1). The present invention is not limited to this. For example, a housing part including curved side walls on the sides of the long sides is formed on a laminated film, and such a laminated film may be used as an exterior body. In this case, the pressure reduction step in the foregoing production method is not essential. When the pressure reduction step is not carried out, a sealed battery including an electrolyte solution as an electrolyte can be produced according to this production method.

Variation 2

Suitable adjustment of the pressure-reduced state in the pressure reduction step makes it possible to omit thermal welding of the edge part 73 and the edge part 75 in the foregoing embodiment (see FIGS. 4 to 6). That is, the electrode body 1 is wrapped in the laminated film 7, the sealed part is formed along the edge part 72 on the side of a short side of the housing part 71 in the laminated film 7, and the sealed part 76 is formed along the side wall 71*b* of the housing part 71. Next, the pressure inside the laminated film 7 in the form of a bag is reduced. Here, the pressure-reduced state is adjusted so that the edge part 72 and the edge part 74 on the sides of the short sides of the laminated film 7, and the sealed part 76 do not curve, to curve the side wall 71*b* and the side wall 71*d* on the sides of the long sides of the housing part 71 toward the electrode body 1. Then, the sealed part 77 is formed along the side wall 71*d* of the housing part 71, to seal the laminated film 7.

Variation 3

In the foregoing embodiment, one laminated film is folded to wrap the electrode body, to form the sealed parts along the three sides. The present invention is not limited to this. Two laminated films may be used. In the first heating step in such a variation, a sealed part is formed along the edge part 74 (see FIG. 4) on the side of a short side of the laminated film 7.

TEST EXAMPLES

The test examples described below were done by the inventor of the present invention when the technique disclosed herein was conceived.

Test Example 1: Examination of Deformation of Long Side Parts of Exterior Body

The correlation between the ratio of the width of a sealed part on a long side part of an exterior body and the length of the long side part, and the degree of stress that may be generated at the long side part in a pressure reduction step was examined. Specifically, this test was done assuming that the exterior body included an aluminum layer as a metal layer, and the sealed battery 100 was produced as the ratio L2/W1 of the width W1 of the respective sealed parts 41 and 43 in the long side parts 22 and 24 of the exterior body 2 and the length L2 of the respective long side parts shown in FIG. 2 was changed. In this test, first, the electrode body 1 having a wide rectangular face was made by a conventional method. The electrode body 1 was housed in the housing part 30 of the exterior body 2 made of a laminated film. The sealed battery 100 including the exterior body 2, the inside of which was in a vacuumed state, where the sealed parts 41,42 and 43 were formed, was made by the foregoing method. Here, the sealed batteries 100 each of which had a different width W1 of the respective sealed parts 41 and 43 in the long side parts 22 and 24 of the exterior body 2 were prepared. That is, the sealed batteries 100 each of which had a different ratio L2/W1 of the width W1 of the respective sealed parts 41 and 43 in the long side parts 22 and 24 of the exterior body 2 and the length L2 of the respective long side parts were prepared. For each of the sealed batteries 100, stress σ generated at the sealed parts 41 and 43 was calculated based on a curvature of such sealed parts, that is, the degree of bending of such sealed parts toward the inside of the sealed battery.

Figure 7:
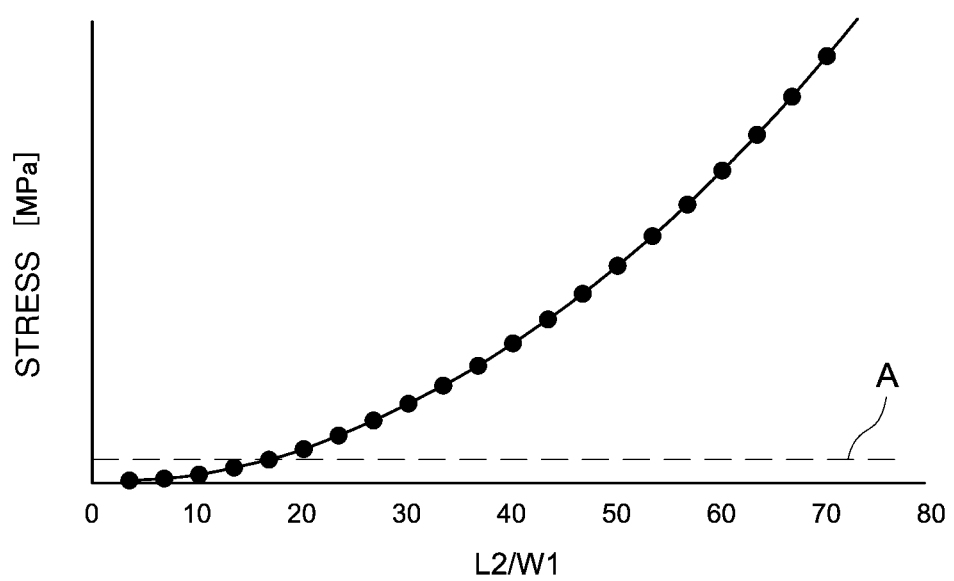
FIG. 7 is a graph showing the relationship between the ratio L2/W1 of a width W1 of respective sealed parts in long side parts of an exterior body and a length L2 of the respective long side parts, and a degree of stress that may be generated in the long side parts in a pressure reduction step.

FIG. 7 shows the results of the test example 1. In FIG. 7, "L2/W1" of the X axis shows the ratio L2/W1, and "stress [MPa]" of the Y axis shows the degree of the stress that may be generated at the long side parts of the exterior body. The straight line A in FIG. 7 shows the proof stress of aluminum. FIG. 7 shows that when the stress is lower than A, the long side parts do not deform, and when the stress is A or more, the long side parts can deform.

As shown in FIG. 7, it was found that the higher the ratio L2/W1 is, the higher the degree of the stress generated at the long side parts of the exterior body is. It was found that since the ratio L2/W1 more than 15 leads to the stress A or more, wrinkles and warps are easily generated in the pressure reduction step on the long side parts of the sealed battery 100 including an exterior body having the ratio of measurements of the length L2 and the width W1 as the foregoing. Therefore, it was found that the technique disclosed herein is preferably applied to such a sealed battery 100.

Test Example 2: Examination of Arrangement of Current Collector Terminals

The correlation between the ratio of measurements, that is, the ratio of the length and the width of an exterior body, and stress that may be generated at terminal structure in a pressure reduction step was examined. Specifically, this test was done assuming that the sealed battery 100 was produced as the ratio L2/L1 of the length L1 and the length L2 shown in FIG. 2 was changed. That is, in this test, concerning the exterior body 2, the length L1 shows the length of the side where the current collector terminals 3 and 4 are arranged, that is, the length of the respective short side parts 23 and 25 in FIG. 2, and the length L2 shows the length of the side where the current collector terminals 3 and 4 are not arranged, that is, the length of the respective long side parts 22 and 24 in FIG. 2. The specific procedures for this test were as follows. First, the electrode body 1 having a wide rectangular face was made by a conventional method. The electrode body 1 was housed in the housing part 30 of the exterior body 2 made of a laminated film. The sealed battery 100 including the exterior body 2, the inside of which was in a vacuumed state, where the sealed parts 41, 42 and 43 were formed, was made by the foregoing method. Here, the sealed batteries 100 each of which had a different ratio L2/L1 of the length L1 of the side where the current collector terminals 3 and 4 were arranged, and the length L2 of the side where the current collector terminals 3 and 4 were not arranged were prepared. For each of the sealed batteries 100, stress σ generated at the side where the current collector terminals 3 and 4 were arranged was calculated based on a curvature of such a side, that is, the degree of bending of such a side toward the inside of the sealed battery.

Figure 8:
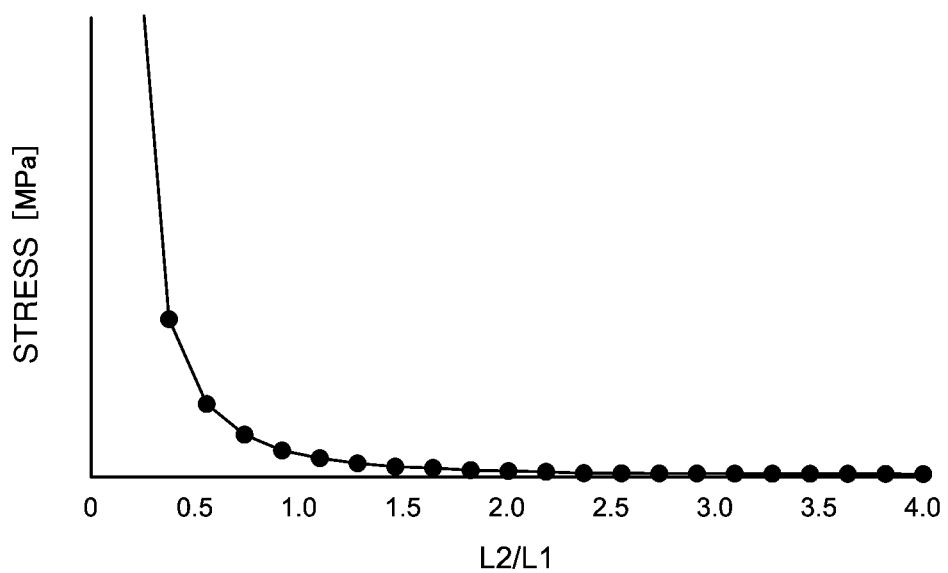
FIG. 8 is a graph showing the relationship between the ratio L2/L1 of a length L1 of respective short sides and the length L2 of the respective long sides of the exterior body, and a degree of stress that may be generated in terminal structure of the exterior body in the pressure reduction step.

FIG. 8 shows the results of the test example 2. In FIG. 8, "L2/L1" of the X axis shows the ratio L2/L1, and "stress [MPa]" of the Y axis shows the degree of the stress that may be generated at the side where the current collector terminals were arranged.

As shown in FIG. 8, it was found that the higher the ratio L2/L1 is, the lower the degree of the stress generated at the terminal structure is. It was found that the ratio L2/L1 less than 1, that is, the length L1 of the side where the current collector terminals were arranged longer than the length L2 of the side where the current collector terminals were not arranged makes the terminal structure deformable due to the stress generated in the pressure reduction step. It was however found that the ratio L2/L1 more than 1, that is, the length L1 of the side where the current collector terminals were arranged shorter than the length L2 of the side where the current collector terminals were not arranged makes it difficult to generate stress on the relevant portions due to the pressure reduction step. In other words, it was found that the current collector terminals are preferably arranged on any short side part of the exterior body. It was also found that in view of prevention of the terminal structure from deforming, the ratio L2/L1 is preferably 1.5 or more, and further preferably 2 or more.

The invention claimed is:

1. A sealed battery comprising:
an electrode body including a positive electrode and a negative electrode, the electrode body having a wide face in a rectangular shape which has two long sides and two short sides;
an exterior body housing the electrode body, the exterior body being made of a laminated film which is folded to wrap the electrode body; and
a positive electrode current collector terminal and a negative electrode current collector terminal for external connection, wherein the positive electrode and negative electrode current collector terminals is included in the positive electrode and the negative electrode respectively, at least respective parts of the positive electrode and negative electrode current collector terminals is arranged outside the exterior body, and the positive electrode and negative electrode current collector terminals are both arranged on one of the two short sides of the wide face of the electrode body,
wherein the exterior body, whose periphery has two long side parts corresponding to the two long sides of the wide face, and two short side parts corresponding to the two short sides of the wide face in a state where the electrode body is housed in the exterior body, includes a housing part housing the electrode body, and
sealed parts formed on the periphery of the exterior body, around the housing part, and along the two long side parts and one of the two short side parts corresponding to the one of the two short sides where the positive electrode and negative electrode current collector terminals are both arranged, wherein the sealed parts isolate an inside and an outside of the exterior body from each other, laminated halves of the laminated film are thermal-welded to each other at the sealed parts, and the sealed parts are straight lines,
wherein the housing part has:
a flat face facing the wide face of the electrode body, and
four side walls corresponding to four sides of the wide face respectively, wherein the four side walls rise from the sealed parts toward the flat face, and
a pair of the side walls corresponding to the long sides of the wide face, among the four side walls, curves inward of the exterior body and toward the electrode body so as to closely approach the electrode body;
wherein:
a ratio of a length of the respective long side parts of the exterior body to a length of the respective short side parts of the exterior body is 2 or more and 3 or less;
a ratio of a length of the respective long side parts of the exterior body to a width of the sealed parts in the long side parts is 15 or more;
the exterior body comprises a first resin layer, a metal layer and a second resin layer which are laminated in that order from the inside to the outside of the exterior body;
the metal layer has a thickness of 0.01 μm or more and 100 μm or less; and,
in the two long sides and two short sides of the flat face of the housing part, a ratio of a distance between a curve apex in one of the two long sides and a curve apex in the other of the two long sides, to a length of the respective short sides is 0.9 or more and 0.99 or less.

2. A sealed battery comprising:
an electrode body including a positive electrode and a negative electrode, the electrode body having a wide face in a rectangular shape which has two long sides and two short sides; an exterior body housing the electrode body, the exterior body being made of two laminated films; and a positive electrode current collector terminal and a negative electrode current collector terminal for external connection, wherein the positive electrode and negative electrode current collector terminals is included in the positive electrode and the negative electrode respectively, at least respective parts of the positive electrode and negative electrode current collector terminals is arranged outside the exterior body, and the positive electrode and negative electrode current collector terminals are both arranged on one of the two short sides of the wide face of the electrode body, wherein the exterior body, whose periphery has two long side parts corresponding to the two long sides of the wide face, and two short side parts corresponding to the two short sides of the wide face in a state where the electrode body is housed in the exterior body, includes a housing part housing the electrode body, and sealed parts formed on the periphery of the exterior body, around the housing part, and along the two long side parts and the two short side parts, wherein the sealed parts isolate an inside and an outside of the exterior body from each other, the laminated films are thermal-welded to each other at the sealed parts, and the sealed parts are straight lines, wherein the housing part has:

a flat face facing the wide face of the electrode body, and four side walls corresponding to four sides of the wide face respectively, wherein the four side walls rise from the sealed parts toward the flat face, and a pair of the side walls corresponding to the long sides of the wide face, among the four side walls, curves inward of the exterior body and toward the electrode body so as to closely approach the electrode body;

wherein:

a ratio of a length of the respective long side parts of the exterior body to a length of the respective short side parts of the exterior body is 2 or more and 3 or less;

a ratio of a length of the respective long side parts of the exterior body to a width of the sealed parts in the long side parts is 15 or more;

the exterior body comprises a first resin layer, a metal layer and a second resin layer which are laminated in that order from the inside to the outside of the exterior body;

the metal layer has a thickness of 0.01 μm or more and 100 μm or less; and, in the two long sides and two short sides of the flat face of the housing part, a ratio of a distance between a curve apex in one of the two long sides and a curve apex in the other of the two long sides, to a length of the respective short sides is 0.9 or more and 0.99 or less.

* * * * *